United States Patent [19]
Kubo et al.

[11] 3,720,409
[45] March 13, 1973

[54] APPARATUS FOR SUCCESSIVELY TAKING OUT PAPERS FROM A STACK THEREOF

[75] Inventors: Mitsuo Kubo, Tokyo; Shunichi Nakajima, Yokohama, both of Japan

[73] Assignee: Tokyo Shibaura Electric Co., Ltd., Kawasaki-shi, Japan

[22] Filed: April 7, 1971

[21] Appl. No.: 132,079

[52] U.S. Cl. .................................................271/29
[51] Int. Cl. ................................................B65h 3/08
[58] Field of Search.................271/27, 28, 29, DIG. 1

[56] References Cited

UNITED STATES PATENTS

| | | | |
|---|---|---|---|
| 3,041,068 | 6/1962 | Schalegger | 271/DIG. 1 |
| 2,806,965 | 9/1957 | Carlisle | 271/62 B |
| 3,597,594 | 8/1971 | Evans | 271/27 |

*Primary Examiner*—Richard E. Aegerter
*Attorney*—Flynn & Frishauf

[57] ABSTRACT

Sheet feeding apparatus comprises paper supply means including means for progressively advancing a stack of papers, a rotary member positioned on the output side of the paper supply means, and a suction head supported by the rotary member so as to be rotatable about its own axis and to rotate about the axis of the rotary member in response to the rotation of the rotary member. The suction head has a vacuum suction port to suck and separate the foremost sheet of paper from the stack and suction conveyor means is disposed close to the locus of revolution of the suction head to suck and convey the sheet of paper sucked and separated by the suction head away from the stack.

17 Claims, 12 Drawing Figures

APPARATUS FOR SUCCESSIVELY TAKING OUT PAPERS FROM A STACK THEREOF

This invention relates to apparatus for successively feeding papers, paper money, and the like, and more particularly to automatic apparatus for successively separating and feeding stacked papers and the like.

Many types of apparatus for successively feeding stacked sheets of papers are now widely used in printing machines and the like. Papers processed by such apparatus are ordinarily new, flat and smooth so that separation of respective sheets can be done by a relatively simple device.

However, paper money is frequently folded and unfolded during circulation and is spoiled or deformed by many people handling them. When collected in banks, the paper money is counted and inspected by the working staff of the banks and classified into usable bills and spoiled or injured bills and are often inspected as to whether they are genuine or counterfeit. The new counting operation of these papers can be readily mechanized or automated and such automatic machines have already been commercialized. Such automatic machines require automatic apparatus for successively separating and taking out or feeding sheets of papers from a stack thereof in order to inspect them automatically.

Accordingly, it is an object of this invention to provide a new and improved apparatus for successively separating and taking out or feeding sheets of papers from a stack thereof.

Another object of this invention is to provide an apparatus for successively feeding papers wherein feeding of two or more sheets at a time can be positively prevented.

According to this invention, there is provided apparatus for feeding papers from a stack comprising paper supply means including means for holding the papers in a stacked state, and means for progressively advancing the stack of papers; a rotary member positioned on the output side of the paper supply means; means for rotating the rotary member; a suction head supported by the rotary member so as to rotate about its own axis and to rotate about the axis of the rotary member in response to the rotation of the rotary member the suction head having a vacuum suction port to suck and separate the foremost sheet of paper; and suction conveyor means disposed close to the locus of revolution of the suction head to attract and convey the sheet of paper sucked and separated by the suction head.

Further objects and advantages of the invention can be more fully understood from the following detailed description when taken in conjunction with the accompanying drawings, in which.

Figure 1:
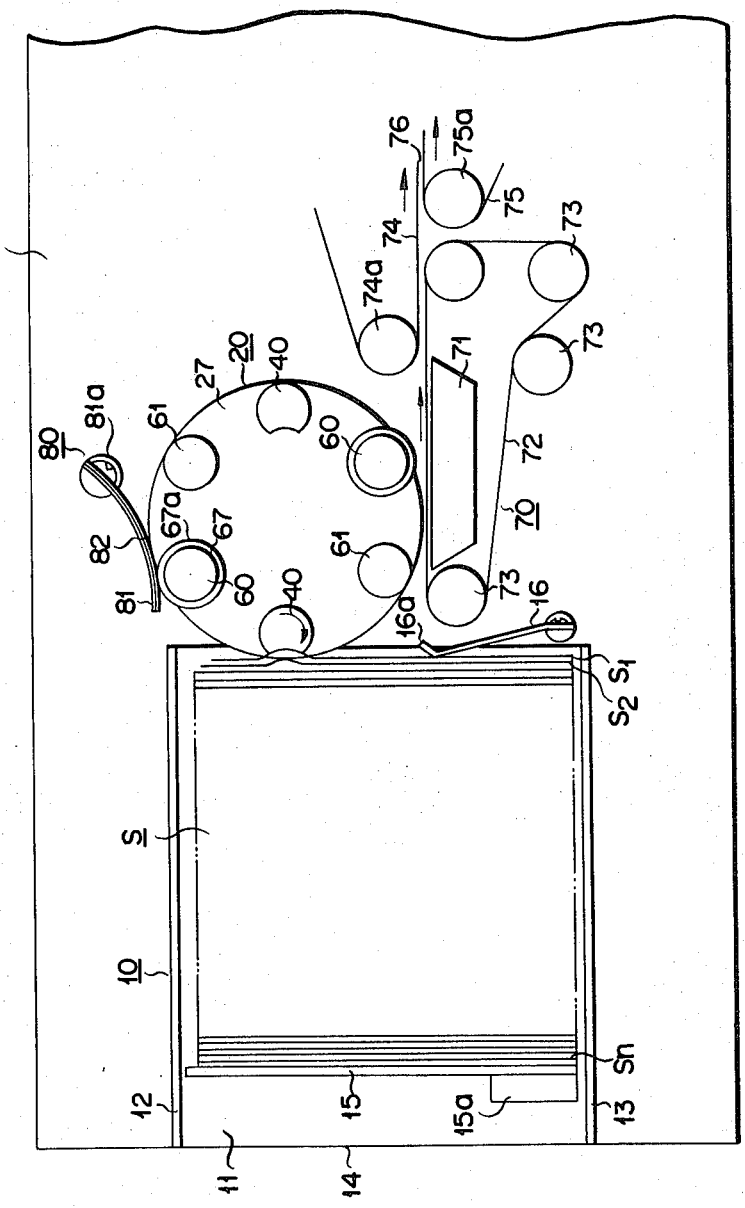
FIG. 1 shows a diagrammatic plan view of the apparatus.

With reference now to FIG. 1, a paper supply device 10 comprises a duct shaped paper magazine 14 for sheets of papers S defined by a bottom plate 11 and vertical side walls 12 and 13 secured to the bottom plate 11. The magazine is secured to a frame F and contains therein a stack of papers S which are held upright on the bottom plate. The magazine includes a vertical rear plate 15 adjustable in the horizontal direction as viewed in FIG. 1 to support the rearmost sheet $S_n$ of the stack. Although not shown in the drawing, the frame 15a of supporting frame 15 is connected to a weight through a cord to urge the stack of the papers to the right by a constant force. On the extension of the bottom plate 11 is secured a leaf spring 16 to urge the foremost sheet $S_1$ of the stack by the free end 16a of the leaf spring.

A paper taking out or feed head assembly 20 is disposed in front of the paper supply device 10. The details of this paper taking out device 20 are shown in FIGS. 2 and 3.

Figure 2:
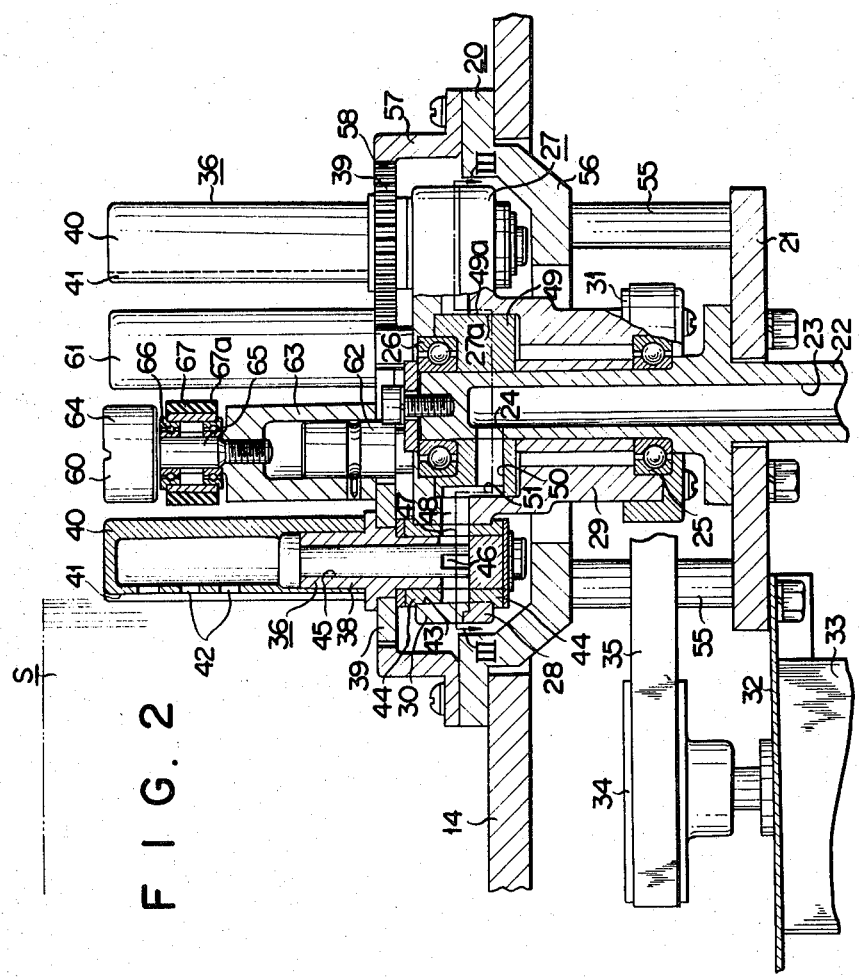
FIG. 2 shows a longitudinal section of a paper taking out head utilized in this invention.
Figure 3:
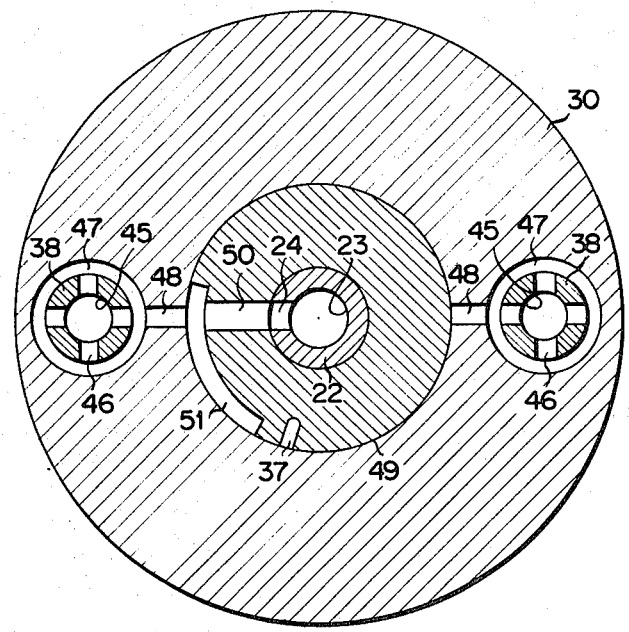
FIG. 3 shows a sectional view taken along a line III—III in FIG. 2.

As shown in FIGS. 2 and 3, the paper taking out device comprises a base 21 secured to frame F, and a vertical hollow shaft 22 extending through base plate 21 at substantially the center of base plate 21. A vacuum suction device, a vacuum pump 114 shown in FIG. 8, for example, is connected to the lower end of the bore 23 of the hollow shaft 22 whereas the upper end is closed and is provided with a lateral opening 24. Bearing means 25 and 26 are mounted on the periphery of the upper portion of hollow shaft to rotatably support a rotary member 27 comprising a sleeve 29 having a radially extending relatively wide flange 28 and an annular rotary disc 30 mounted on flange 28. A pulley 31 is mounted on the lower end of sleeve 29, which is driven by an electric motor 33 mounted on a support 32 secured to the lower side of base 21 through a pulley 34 and a belt 35 for rotating the rotary member 27 about hollow shaft 22 at a constant speed. A pair of suction head assemblies 36 extend through the flange 28 of rotary member 27 and rotary disc 30 at diametrically opposite points with respect to shaft 22, each of the suction head assemblies being rotatably supported by rotary member 27. Each suction head assembly 36 comprises a bottomed cylindrical shaft 38 and a gear 39 mounted on the shaft 38 at an intermediate point thereof. On the upper end of shaft 38 is fitted a cylindrical suction head 40, one side surface thereof being concave as at 41 which communicates with the interior of the suction head 40 through a plurality of radial suction ports or openings 42. A bearing sleeve 44 journalling shaft 38 is received in an opening 43 extending through rotary disc 30 and flange 28 of the rotary member 27. Vent openings 46 are formed at the lower end of hollow shaft 38 to communicate the internal bore 45 of shaft 38 with radial openings 48 of circular disc 30 through an annular opening 47 of the bearing sleeve 44. A vertical cylinder 49 is secured to the outside of hollow shaft 22 between bearings 25 and 26 in such a manner that the outer peripheral surface 49a of the cylinder 49 slidably engages the inner surface of rotary member 27. Cylinder 49 is formed with a radial vent opening 50 terminating at it outer end with a circumferential groove 51 as shown in FIG. 3. The inner end of vent opening 50 is communicated with bore 24 of hollow shaft 22 whereas the outer end with the inside of suction head 40 through openings 46, 47 and 48. Accordingly, as the rotary member 27 is rotated about cylinder 49 the interior of the suction head 40 is evacuated only when openings 48 and 51 align with each other to suck a sheet of paper S. In other words, the rotary member 27 functions as a valve device as the suction heads 40 are revolved, as will be described later in more detail.

Furthermore, as shown in FIG. 3, a groove 37 is provided for cylinder 49 at a point behind groove 51. One end of groove 37 is arranged to communicate with opening 48 through flange 28 of the rotary member 27 whereas the other end is vented to the atmosphere. Accordingly, immediately after closure of opening 48 by the cylinder 49 to stop evacuation of the suction head 40, the head will be vented to the atmosphere through groove 37 to release the sheet of paper.

A bottom cover 56 for covering rotary member 27 is supported by vertical posts 55 secured to base 21. A vertical ring 57 is secured to the upper side of cover 56 to surround the outer periphery of the upper portion of rotary member 27. On the inner periphery of ring 57 are formed gear teeth 58 meshing with the gear 39 on the suction head assembly 36 to rotate suction head assemblies and hence suction heads 40 about their own axes and to revolve these members about the axis of shaft 22 as the rotary member 27 is rotated. In this example, it is designed that suction heads are rotated three times per one revolution.

There are also provided a cylindrical separation head 60 and a cylindrical pressing head 61 with their lower ends secured to the peripheral portion of the rotary disc 30 of rotary member 27. These heads 60 and 61 are positioned between the pair of suction heads 40 with an equal spacing as best shown in FIG. 1.

The separation head 60 may be a mere cylindrical member but it is advantageous that the separation head is provided with a rotatable friction member. More particularly, a vertical shaft 62 is provided above the rotary disc 30 to support a bottomed cylindrical member 63 having a screw 64 threaded into the upper end thereof. A pressing roller 67 of resilient material having a large coefficient of friction, such as rubber, is rotatably mounted on the shank 65 of screw 64. The pressing roller 67 is designed to have a larger diameter than the head of screw 64 and cylindrical member 63 so as to engage the rear surface of a sheet of paper $S_1$ separated by the suction head 40 for urging it against the surface of a suction belt to be described later.

As shown in FIG. 1, the rotary member 27 is disposed such that it successively brings respective heads 40, 60 and 61 to engage the foremost paper $S_1$ in the paper supply device 10. A braking device or rotation control means 80 is also provided to prevent rotation of separating head 60 comprising a leaf spring 81 secured to a post 81a on frame F. The leaf spring 81 is lined with a strip 82 of rubber, for example, having a large coefficient of friction and is positioned such that it engages only with the outer periphery 67a of the pressing roller 67 of separation head 60 but not with other heads 40 and 61. Accordingly, where the pressing roller 67 of the separation head 60 is rotated in the counterclockwise direction by the action of a suction conveyor to be described later, the pressing roller 67 will be braked and imparted with a rotation in the clockwise direction by the contact with the rotation control means 80.

Pressing head 61 also includes a cylindrical portion with its base portion secured to the rotary disc 30 of the rotary member 27 for assisting the operation of the separation head 60. For this reason, similar to separation head 60 the pressing head 61 is also caused to revolve about the axis of shaft 22 as the rotary member 27 is rotated.

A suction conveyor 70 is disposed close to the supply device 10 and taken out head assembly 20 as shown in FIGS. 1 and 4a to 4e. More particularly, a vacuum suction chamber 71 is provided with its suction opening positioned nearly tangentially to the loci of revolution of respective heads 40, 60 and 61 of take out head assembly 20. An endless belt 72 driven by rollers 73 of a suitable driving device, not shown, is caused to pass over the suction opening of the suction chamber 71 in the direction shown by an arrow. Although not shown in the drawing, belt 72 is provided with a number of perforations communicating with the interior of the suction chamber 71. Endless belt 72 cooperates with another adjoining belt 74 passing around rollers 74a and belt 75 passing around roller 75a to form a conveyor passage 76.

The operation of the apparatus for successively taking out stacked papers S will be described hereunder with particular reference to FIGS. 4a to 4e. As shown in FIG. 1, a plurality of sheets of papers S are vertically disposed in a side by side relationship in magazine 14 on bottom plate 11 thereof. The rearmost sheet Sn of the stack is supported by supporting plate 15 whereas the outermost sheet $S_1$ is resiliently engaged by leaf spring 16.

Vacuum pump 114 is started to evacuate suction head 40 and vacuum suction chamber 71 to a definite vacuum. Then driving motor 33 is started to drive rotary member 27 and suction conveyor 70, that is belts 72, 74 and 75 thereof.

Under these conditions, sheets of papers are successively taken out of the magazine as shown in FIGS. 4a to 4e. In a condition shown in FIG. 4a wherein one of the suction heads 60 is not yet brought to a position confronting the outermost sheet of paper $S_1$, as the rotary member 27 is rotated in the counterclockwise direction, suction head 40 revolves in the counterclockwise direction and rotates in the clockwise direction, whereas separation heads 60 are maintained out of engagement with the paper. At this time, pressing head 61 holds the outermost sheet of paper $S_1$ against forward movement.

Figure 4A:
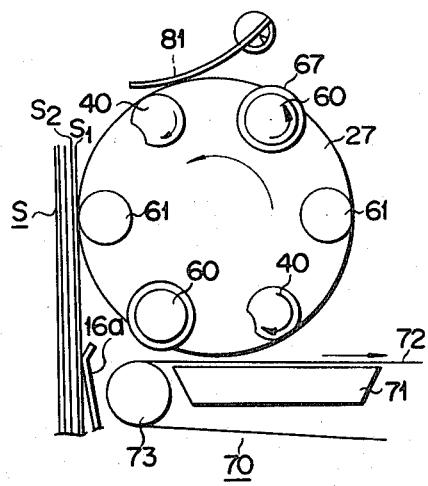
FIGS. 4a to 4e show diagrammatic plan views useful to explain the operation of the apparatus of this invention.
Figure 4B:
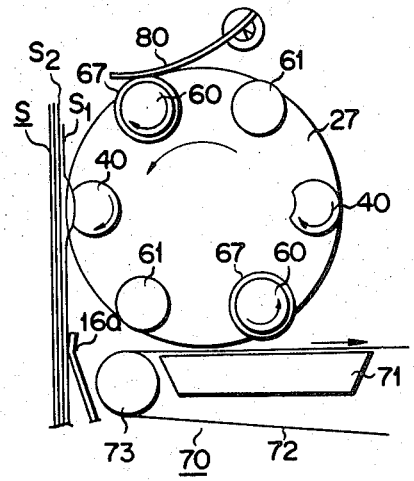

At the stage shown in FIG. 4b, one of the suction heads 40 is brought to confront the outermost sheet of paper $S_1$. When the paper is attracted by the suction head, the pressing roller 67 of the separation head 60 is arrested by braking device 80. Where the pressing roller 67 has been rotated in the counterclockwise direction, the baking device 80 applies a braking force to roller 67 whereas when the roller 67 leaves the braking device 80, a clockwise rotation is imparted to the pressing roller 67.

Figure 4C:
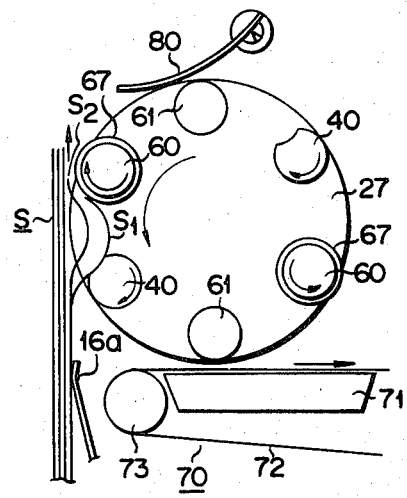
Figure 4D:
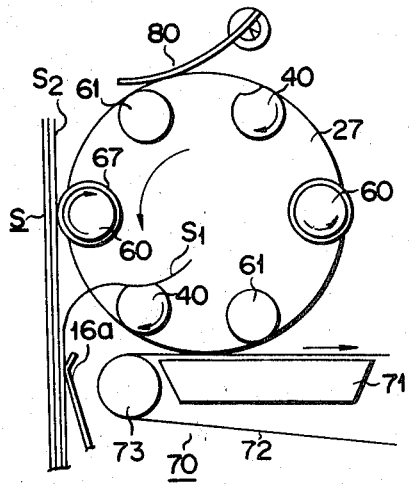

In the step shown in FIG. 4c, the rotation of suction head 40 pulls the upper end of the sheet $S_1$ which is attracted by the suction head 40 through opening 42 toward the center of rotary member 27 thus separating sheet $S_1$ from the next sheet $S_2$. At this time, the upper end of the second sheet $S_2$ which has been similarly flexed is caused to engage the pressing roller 67 of the separation head 60. Regardless of the area of this engagement the pressing roller 67 is rotated in the direction opposite to that in which the sheet $S_1$ is pulled out. Further as the roller 67 is made of a material which has a high frictional coefficient, the second sheet $S_2$ will be pulled in the direction as shown by an arrow. Accordingly, as shown in FIG. 4d, the deformation or displacement of the upper portion of the second sheet $S_2$ is corrected whereas the first sheet is pulled out further by suction head 40. In other words, first and second sheets $S_1$ and $S_2$ are separated completely by the unique action of the separation head 60, thus eliminating the fear of simultaneous taking out of the second sheet.

Figure 4E:
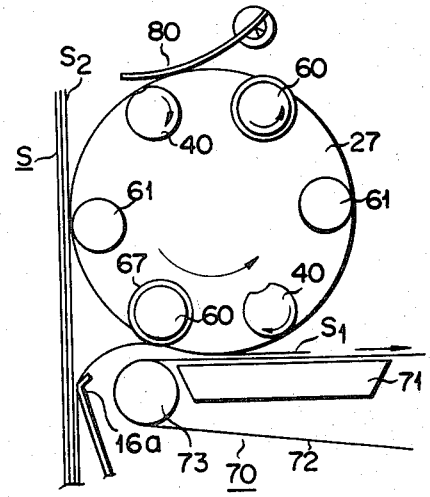

As the suction head 40 continues to rotate the suction of the suction head 40 is terminated by the valve device described hereinabove and the upper end of sheet $S_1$ is disengaged from the suction head 40 as shown in FIG. 4e. Then by the rotation of rotary member 27, the separation head 60 is urged against the rear surface of sheet $S_1$ so as to bend the sheet $S_1$ substantially in the form of a letter L around the free end 16a of leaf spring 16. Then, as the free end of sheet $S_1$ is urged by the pressing roller 67 of separation head 60 the free end of the sheet will be sucked by the suction belt 72 which is running in front of the opening of the vacuum suction chamber 71. The suction belt 72 removes the lower end of the sheet $S_1$ from the magazine against the force of the leaf spring 16 to transfer the sheet along conveyor passage 76. At this time, as the first sheet $S_1$ is rapidly withdrawn the second sheet $S_2$ is maintained at its normal position by its static inertia. Pressing head 61 assists to urge the sheet $S_1$ against conveyor belt 72. At this time, although the pressing roller 67 of the separation head 60 is imparted with a rotation in the counterclockwise direction, or in the same direction as that of its revolution by the contact with conveyor belt 72, as shown in the drawing, but as such a rotation is imparted after the roller 67 has disengaged from the braking device 80, it does not interfere with the normal separating operation.

Such a taking out or feeding operation can be performed at a speed of 500 sheets per minute. Where, only one each of the respective heads are mounted on the rotary member 27, the same speed can be attained by doubling the number of revolutions of rotary member 27.

Although in this embodiment, the opening 42 of the suction head 40 is controlled by the valve device constituted by the opening 48 of rotary disc 30 and opening 51 of cylindrical member 49, it should be understood that the apparatus may be modified such that suction head 40 is normally evacuated whereas the sheet $S_1$ attached by suction head 40 is forcibly separated by the actions of suction belt 72 of the suction conveyor 70 and of the separation head 60.

Figure 5:
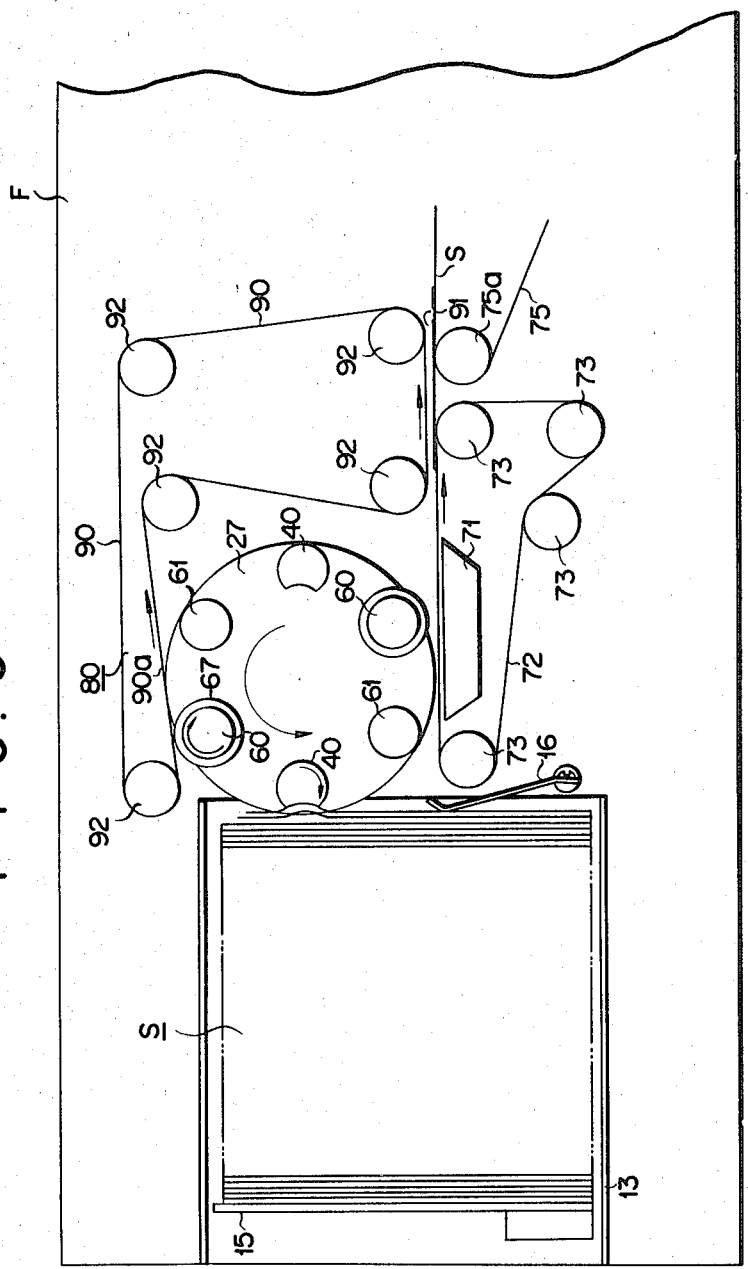
FIG. 5 shows a diagrammatic plan view of a modified embodiment of this invention.

In the modified embodiment shown in FIG. 5, the braking device or rotation control device 80 for the pressing roller 67 of the separation head 60 constituted by a leaf spring 81 is replaced by running belt 90. More particularly, an endless belt 90 comprising a conveyor passage 91 is passed around respective rollers 92 such that a portion 90a of the belt engages the pressing roller 67 of separation head 60 at a point immediately before the point at which one of the separation heads 60 comes to oppose the stack of papers S. As shown in FIG. 5, the portion 90a of belt 90 runs in the direction opposite to the direction of rotation of the rotary member 27 so as to impart a clockwise rotation to the pressing roller 67 of the separation head 60 as the belt comes to engage the pressing roller. For this reason, the displacement of the paper S in the taking out or feeding direction can be prevented by the action of the pressing roller 67 in the same manner as in the previous embodiment. As this rotation control device 80 is constituted by a portion of belt 90 that defines the conveyor passage 91 it is not necessary to provide an independent driving device for belt 90. Other elements operate in the same manner as those of the first embodiment.

Figure 6:
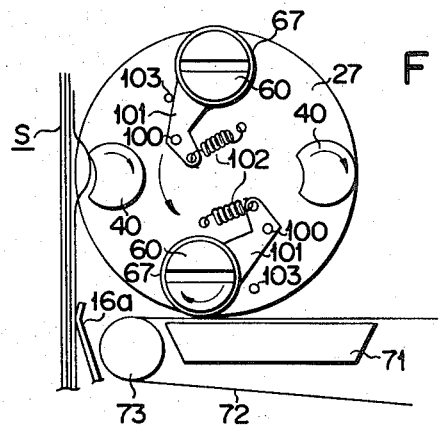
FIG. 6 shows a diagrammatic plan view of a further modification of this invention.
Figure 7:
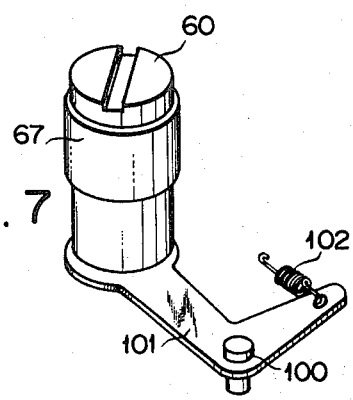
FIG. 7 is an enlarged perspective view of a separation head utilized in the embodiment shown in FIG. 6.

In another embodiment shown in FIGS. 6 and 7, the pressing heads 61 in the previous embodiments are eliminated while the separation heads 60 are constructed to be displaceable. More particularly, each one of separation heads 60 is carried by one end of a crank arm 101 pivotally secured to rotary member 27 by means of a pivot pin 100. The opposite end of the crank lever 101 is connected to the rotary member 27 through a tension spring 102. Thus, the head 60 is biased to project beyond the periphery of rotary member 27 until crank arm 101 engages a stop pin 103 on the rotary member 27.

Consequently, when the separation head 60 comes to engage the paper S or belt 72, the crank arm 101 is rotated in the clockwise direction about pin 100 so that the separation head 60 is revolved in the clockwise direction while it is displaced toward the center of the rotary member 27. This assures positive contact between the separation head 60 and the paper S or belt 72 so that it is possible to hold the paper with a sufficient force or to positively suck and convey the paper by the belt 72. The rotation control means may be arranged for this separation head 60, but is not shown in FIG. 6.

In these embodiments, in order to positively attract the paper by the suction head 40, the pressure applied by the supporting plate 15 of the paper supply device 10, the speed of rotary member 27 and the suction pressure of suction head 40 of the taking out head assembly 20 are suitably selected. However some papers are relatively stiff while others are relatively soft. Especially, the stiffness of paper money varies largely dependent upon their period of circulation. For this reason, should the suction head fail to satisfactorily attract a paper sheet, it is necessary to detect such failure so as to assure positive attraction in the next cycle.

Figure 8:
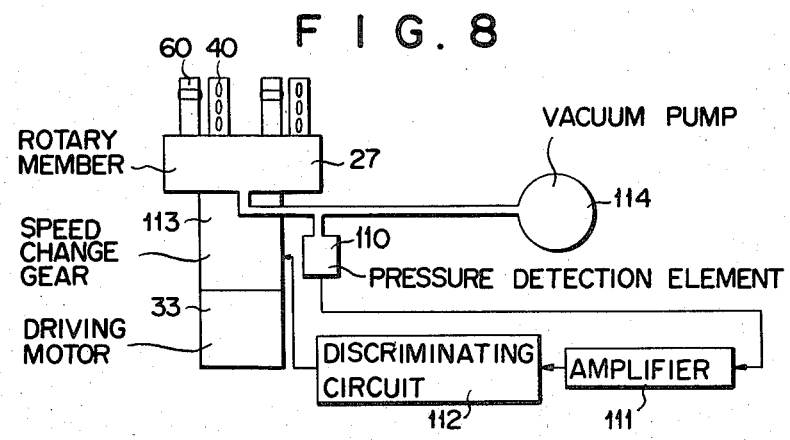
FIG. 8 shows a block diagram of a device for regulating the speed of a rotary member.

FIG. 8 shows a block diagram of a modified embodiment wherein the variation in the air pressure in the suction ports or openings 42 of suction head 40 is converted into an electric signal by means of a piezoelectric element, for example, so as to discriminate the waveform of the signal to determine whether the paper was taken out normally or not.

Thus, a pressure detection element 110, which may be of any type of pressure responsive element such as a piezoelectric element is connected to a conduit interconnecting vacuum pump 114 and suction head 40. The output signal from the pressure detection element is supplied to a discriminating circuit 112 via an amplifier 111 where it is compared with a reference signal to produce a difference signal indicating the pressure prevailing in the suction head. The difference signal is used to control a speed change gear 113 connected between driving motor 33 and rotary member 27 so as to decrease the operating speed of the rotary member as long as such difference signal persists whereas to restore to normal the operating speed of the rotary member when the difference signal decreases to zero as a result of satisfactory attraction of the paper. If the operating speed is restored gradually or with a time lag, rapid repetition of the speed variation due to the failure of sheet feeding in the next cycle can be precluded.

While in this embodiment, the operating speed of the rotary member 27 is decreased or the period in which suction is possible is elongated in case of the failure of suction, the same purpose can be attained by varying the pressure applied to the stack of papers by the supporting plate 15 or by varying the vacuum in the suction head. Failure of suction can also be detected by providing an opposed light source and photoelectric element which are disposed to produce a signal when the light from the source is interrupted by an attracted paper or a micro-switch operated by the attracted paper.

What we claim is:

1. Sheet feeding apparatus comprising:
    paper sheet supply means including means for holding paper sheets in a stacked state, and means for progressively advancing said stack of paper sheets;
    a rotary member positioned on the output side of said paper sheet supply means;
    means for rotating said rotary member;
    a suction head supported by said rotary member so as to be rotatable about its own axis and to rotate about the axis of said rotary member in response to the rotation of said rotary member;
    means for rotating said suction head said suction head having a vacuum suction port to separate one end of the foremost sheet of paper from the remaining stacked sheets of paper by the application of suction through said vacuum suction port to that side of the foremost sheet of paper which faces said suction head; and
    suction conveyor means disposed close to the locus of revolution of said suction head and arranged to attract the side of said foremost sheet of paper sucked and separated by said suction head, and to convey the separated sheet away from the stack.

2. Apparatus according to claim 1 comprising a hollow shaft supporting said rotary member, an evacuation device connected to said hollow shaft, the suction head being mounted on the periphery of said rotary member, said suction port communicating with the interior of said hollow shaft, and valve means for controlling the communication between said suction head and said hollow shaft in response to the rotation of said rotary member, thereby applying suction to said sheet of paper before said suction port of said suction head engages said sheet of paper and removing said suction after said foremost sheet of paper has been sucked and separated from the stack.

3. Apparatus according to claim 2 wherein said suction head is provided with gear teeth and a fixed member is provided with gear teeth meshing with said gear teeth on said suction head so as to rotate said suction head about its own axis in response to the rotation of said rotary member.

4. Apparatus according to claim 1 wherein a separation head is mounted on said rotary member at a position to the rear of said suction head as viewed in the direction of rotation of said rotary member, whereby as said rotary member rotates said separation head is inserted between a sheet of paper sucked and separated by said suction head and the next sheet of paper so as to feed said separated sheet of paper to said suction conveyor means.

5. Apparatus according to claim 4 wherein said separation head includes a rotary member having a larger diameter than said separation head.

6. Apparatus according to claim 5 wherein said rotary member is made of a frictional member.

7. Apparatus according to claim 5 wherein means for controlling the rotation of said separation head during the rotation of said rotary member is provided near the periphery of said rotary member.

8. Apparatus according to claim 7 wherein said rotation control means is positioned to the rear of the position where said separation head engages the foremost sheet of said paper in said paper supply means and said rotation control means comprises a spring member arranged to resiliently engage the rotary member of said separation head.

9. Apparatus according to claim 7 wherein said rotation control means is positioned to the rear of the position where said separation head engages the foremost sheet of paper in said paper supply means and comprises by an endless belt running in a direction opposite to the direction of rotation of said rotary member.

10. Apparatus according to claim 9 wherein said belt also forms a conveyor passage cooperating with said suction conveyor means for carrying said separated sheet of paper.

11. Apparatus according to claim 5 wherein said separation head is carried by one end of a crank arm pivotally mounted on said rotary member and said crank arm is provided with a spring urging said separation head to the outside of the periphery of said rotary head.

12. Apparatus according to claim 2 wherein said valve means includes a communication passage which vents to the atmosphere said suction port of said suction head when said valve means is closed.

13. Apparatus according to claim 2 which further comprises means for detecting suction of said paper by said suction head and means controlled by said detecting means for controlling the speed of said rotary member.

14. Apparatus according to claim 13 wherein said suction detection means comprises a pressure responsive means responsive to the pressure in said suction head.

15. Apparatus according to claim 13 wherein said suction detection means comprises a source of light and a photoelectric element which are arranged such that the light from said source to said photoelectric element is interrupted by a paper sheet sucked and separated by said suction head.

16. Apparatus according to claim 13 wherein said suction detection means comprises a micro-switch arranged to be operated by a paper sucked and separated by said suction head.

17. Apparatus according to claim 1 wherein said paper sheet supply means includes spring means biased against the other end of said foremost sheet which is opposite the end thereof separated by said suction head, and pressing said other end of said sheet toward the rear of said stack, said suction conveyor means removing a separated foremost sheet from engagement with said spring means.

* * * * *

UNITED STATES PATENT OFFICE
CERTIFICATE OF CORRECTION

Patent No. 3,720,409          Dated March 13, 1973

Inventor(s) Mitsuo KUBO et al

It is certified that error appears in the above-identified patent and that said Letters Patent are hereby corrected as shown below:

Column 7, line 46, after "rotating said suction head" insert --;--;

same line begin new paragraph with "said suction" (second occurrence).

Signed and sealed this 27th day of November 1973.

(SEAL)
Attest:

EDWARD M. FLETCHER, JR.          RENE D. TEGTMEYER
Attesting Officer                Acting Commissioner of Patents